Jan. 28, 1964

R. I. KINROSS 3,119,558

METERING SYSTEMS

Filed Aug. 29, 1958

3 Sheets-Sheet 1

Figure 3:
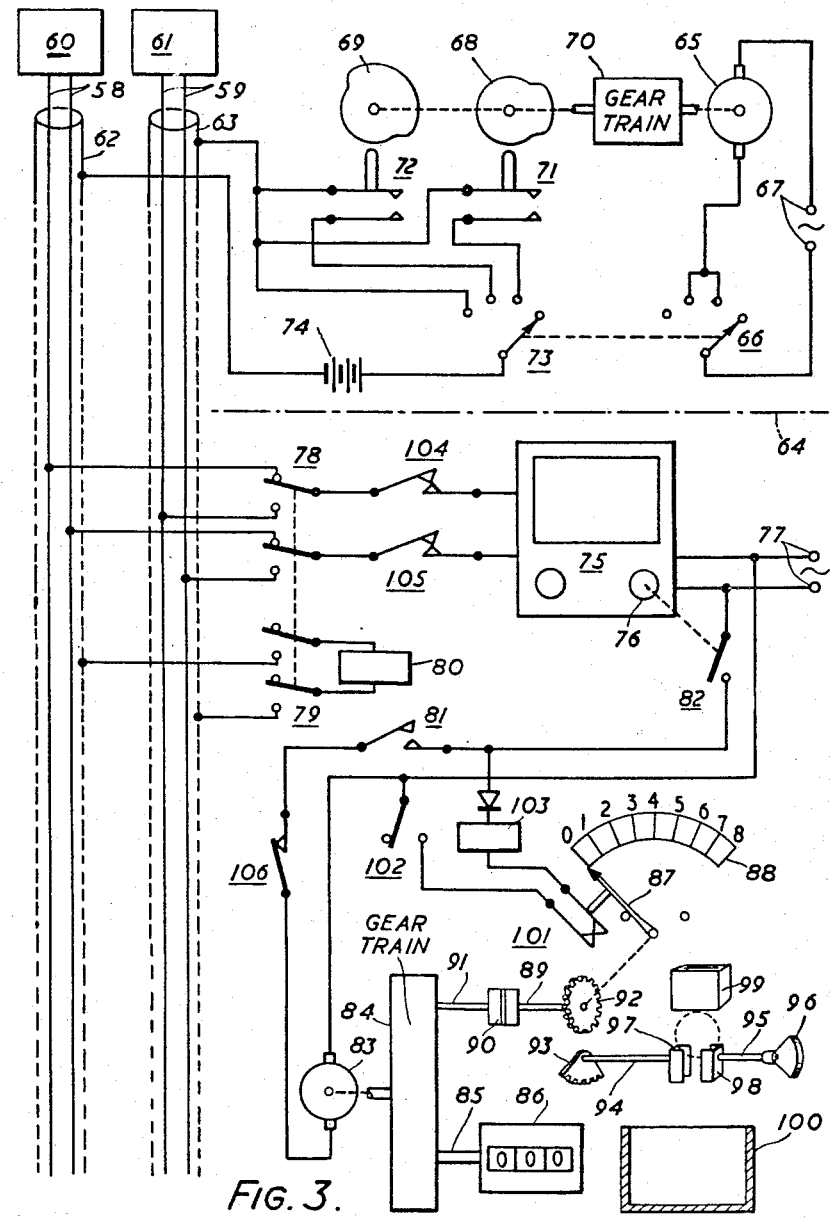

TV fig 3

Motor speed or duty cycle
varies with charge rates.

INVENTOR
Rupert Ivor Kinross
BY
Ag't

United States Patent Office 3,119,558
Patented Jan. 28, 1964

3,119,558
METERING SYSTEMS
Rupert Ivor Kinross, Shepperton, England, assignor to Communications Patents Limited
Filed Aug. 29, 1958, Ser. No. 757,983
Claims priority, application Great Britain Apr. 8, 1958
7 Claims. (Cl. 235—132)

This invention is concerned with metering systems, for example but not exclusively with systems for metering the use of electrical or other equipment for the purpose of enabling such use to be charged for according to a prepared tariff.

In general, a metering mechanism suitable for use in such a system will comprise a metering element, for example a pointer or the operating shaft of a revolution counter, which is adapted to be moved as a function of the time the equipment is in a predetermined condition. In some instances it is required that such a mechanism shall meter the use of an equipment during any given period of time according to any one of several different tariff rates and it is an object of the present invention to provide improved metering systems whereby this requirement is met in a simple and expeditious manner.

Broadly, a metering system according to the invention includes a timing device, which is arranged and adapted to control the movement of a pointer or equivalent metering element as a function of the time an equipment is in a predetermined condition, and an adjustable means which is available at a supervisory station remote from the equipment and whereby the law of said function can be varied so that, for given equal periods of time, the metering element can have imparted thereto different degrees of movement.

With a metering system according to the invention and assuming that a predetermined degree of movement of the metering element corresponds to a predetermined unit charge; the period of time taken to register such unit charge will vary in accordance with the variation of the law of the said function. For example, in some embodiments of the invention the arrangement is such that a certain predetermined speed of operation of the timing device represents the highest tariff rate, for which condition the metering element will register a unit charge in a certain period of time, and metering at a lower tariff rate can be introduced at any time by arranging that an appropriae setting of the adjustable means at the supervisory station causes the timing device to run at a lower speed so that a longer period of time will elapse before the metering element registers a unit charge.

In other embodiments of the invention, the arrangement is such that the highest tariff rate is represented by continuous operation of the timing device at a predetermined speed, for which condition the metering element will register a unit charge in a certain period of time, and metering at a lower tariff rate can be introduced any time by arranging that an appropriate setting of the adjustable means at the supervisory station causes intermittent interruption of the operation of the timing device so that, by lowering the average speed of the device, a longer period of time will elapse before the metering element registers a unit charge.

In further embodiments of the invention, the arrangement is such that the highest tariff rate is represented by continuous movement of the metering element under the control of a timing device which operates at substantially constant speed, for which condition the metering element will register a unit charge in a certain period of time and metering at a lower tariff rate can be introduced at any time by arranging that an appropriate setting of the adjustable means at the supervisory station causes a change in the movement of the metering element, but not necessarily of the operation of the timing device, such that, by lowering the average speed of movement of the metering element, a longer period of time will elapse before said element registers a unit charge.

The timing devices of systems according to the invention can comprise electrical, mechanical or electro-mechanical arrangements of any desired suitable kind. Such timing devices can for example comprise an electric motor, in which case there could be made available at the supervisory station an adjustable means whereby the energisation of the motor can be interrupted for a period of time at predetermined intervals. In other embodiments, the electric motor is of the synchronous type and its speed is varied by making available at the supervisory station an adjustable means for varying the frequency of an alternating current supply which serves to energise this motor. Timing devices which are responsive to the application thereto of electrical impulses can be adopted in carrying out the invention; for example an arrangement can be adopted in which the pointer or other metering element has mechanical movement imparted thereto as a result of the application of mechanical impulses produced with the aid of a solenoid which is energised by a periodic succession of electrical impulses, the frequency of which can be varied by actuation of a suitable adjustable means at the supervisory station.

Metering systems according to the invention enable a considerable number, for example several hundreds, of independently usable equipments to be metered through the intermediary of a single supervisory station, the metering mechanism in respect of each equipment being connected electrically with the supervisory station by way of one or more wire or other conductor lines. Some or all of the metering mechanisms pertaining to such a system can include facilities whereby the user of an equipment can make prepayment for the use of the equipment with the aid of coin-operable or coinfreed devices. Alternatively or in addition, the metering mechanism can include means for establishing a record of the number of unit charges registered thereby so that the user of the equipment can be billed accordingly. Such a record can be in the form of a paper or other strip or disc, which is marked by the metering mechanism with information pertaining to the use of the equipment, and in some cases it can be suitable for use in a mechanical or electro-mechanical accounting system.

A particular application of the invention is the metering of the use of subscribers' equipments in respect of a wired broadcasting network, in which case a central station from which the network extends can include the suprervisory station of the metering system, signal-transmitting lines formed by or as a part of the network being used to bring each metering mechanism under the control of the central station for the purpose of enabling the tariff rate to be varied according to the type or other characteristic of the programme being broadcast over the network.

Figure 1:
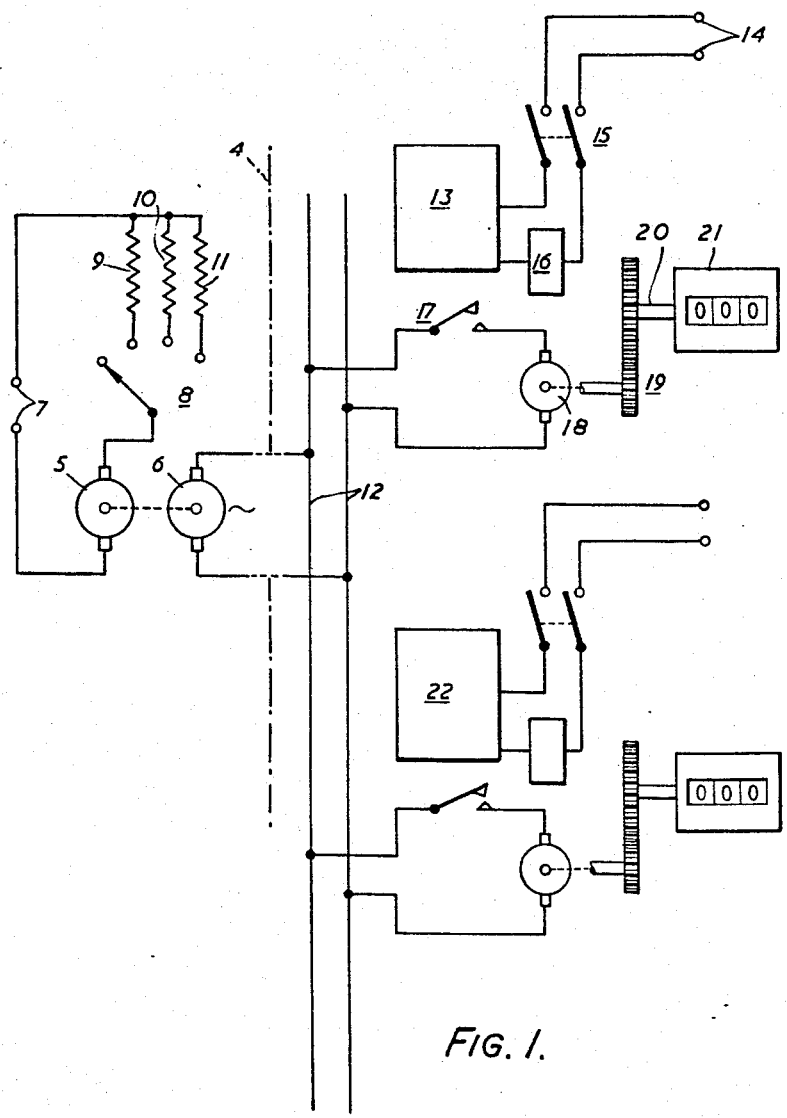
Figure 2:
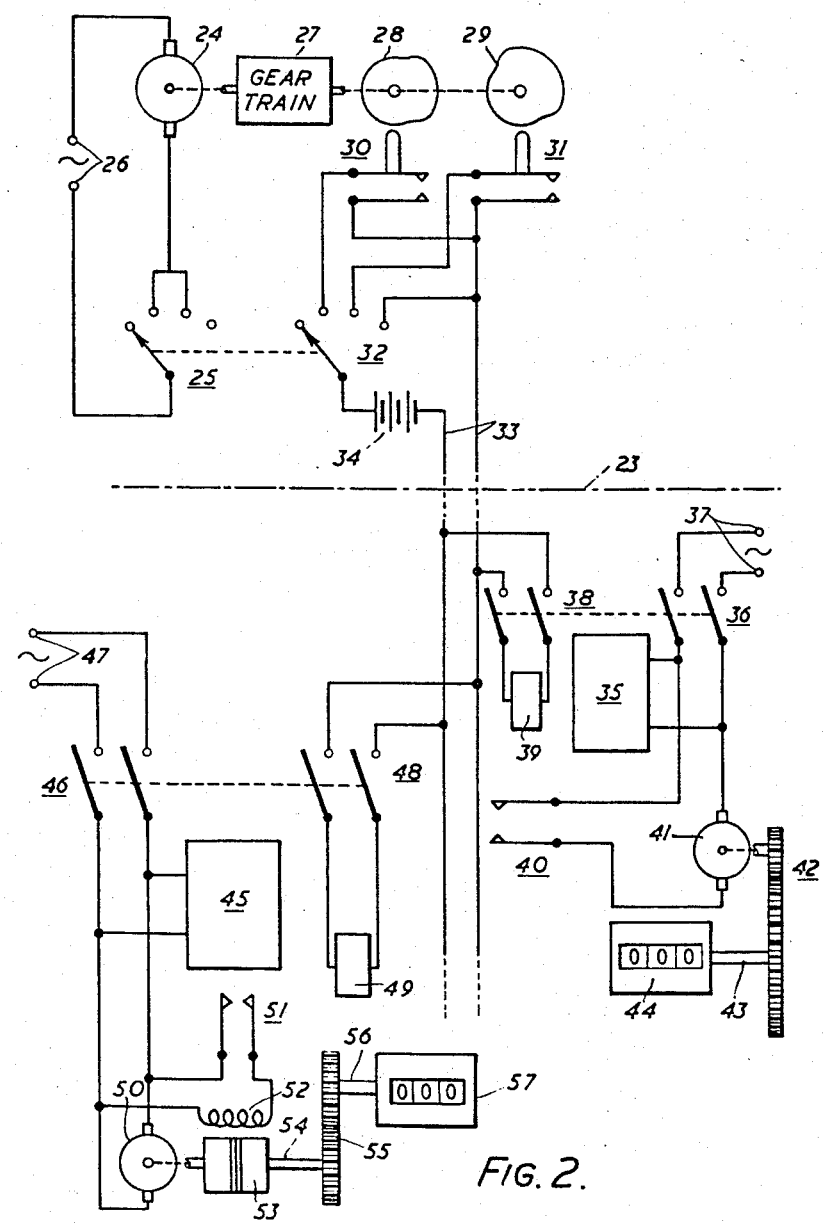

In order that the invention can be understood more readily, several embodiments thereof will now be described, merely by way of example, with reference to the accompanying drawings wherein:

FIG. 1 shows in diagrammatic manner a metering system in accordance with one embodiment of the invention, FIG. 2 shows, in similar manner, a metering system according to another embodiment of the invention, and FIG. 3 shows, also in similar manner, how a metering system according to the invention can be incorporated with a wired broadcasting system in order to register the use of television receivers which form part of the broadcasting system's subscribers' equipments.

In the arrangement illustrated in FIG. 1, the apparatus provided at the supervisory station of the system is indicated on the left hand side of the dot-dash line 4 and comprises an electric motor 5, of the variable speed type, for driving an alternator 6. The motor 5 is adapted to be energised from any desired suitable source of electric power connected between the terminals 7. A singlepole four-way switch 8 is included in the circuit of this motor and three of its contact studs are associated with resistors 9 (high resistance), 10 (intermediate resistance) and 11 (low resistance) respectively, the fourth stud corresponding to the "off" condition. The combination of this switch 8 and the three resistors constitutes an adjustable means at the supervisory station whereby the speed of the motor 5 and consequently the frequency of the output from the alternator 6 can be determined by personnel at this station. For example, adjustment of the switch 8 from the "off" position, as shown on the drawing, to the adjacent contact stud will cause the motor 5 to be energised by way of the resistor 9 to obtain a desired slow running of the motor and a predetermined low frequency output from the alternator 6, this low frequency corresponding to the lowest tariff rate at which the system is to operate. Movement of the switch 8 to introduce the resistor 10 will cause the motor 5 to be energised at a high level in order to obtain from the alternator 6 an output having a higher frequency. Likewise energisation of motor 5 by way of the resistor 11 will result in the output of the alternator 6 having a still higher frequency.

The output from the alternator 6 will accordingly have a frequency which is dependent upon the setting of the switch 8 under the control of supervisory station personnel and this output is applied to the conductors of a communication line 12 which extends between the supervisory station and the location of metering mechanisms and equipments the use of which it is desired to meter. One such equipment is indicated at 13 and in order for this to be brought into use it is necessary for it to be energised by a suitable power supply, for example by a main power supply available across the terminals 14, a two-pole switch 15 being provided for this purpose. The metering mechanism associated with this equipment comprises a relay 16 which has its winding included in the circuit between the switch 15 and the equipment so that the relay is energised whenever the equipment is being used. Such energisation of this relay serves, by closing contacts 17 thereof, to connect a motor 18 of the synchronous type across the line 12 so that said motor is energised by current made available in this line by the alternator 6. The shaft of the motor 18 is connected through a suitable gear train, represented at 19, to a shaft 20 of a revolution counter 21 of any desired suitable kind. This shaft 20 and the motor 18 constitute the metering element and the timing device respectively of the metering mechanism and it will be seen that the movement of the shaft 20 will be controlled as a function of the time the equipment is in use. A predetermined degree of movement of the shaft 20 represents a predetermined unit charge, for example a unit of one shilling, and the total movement of said shaft will cause the counter 21 to establish a display which is indicative of the corresponding total number of such units.

As the motor 18 is a synchronous one its speed will be dependent upon the speed of the alternator 6 as determined by the adjustable means 8–11 of the supervisory station apparatus. Assuming that the arm of the switch 8 has been set in contact with the stud connected to the resistor 11, the alternator 6 will be driven at the highest speed provided for and this corresponds to the highest tariff rate at which it is desired to operate the metering system. For this condition, whenever the equipment 13 is being energised by way of its switch 15 the relay contacts 17 will be closed and the motor 18 will operate in synchronism with the alternator 6, the shaft 20 being moved an amount sufficient for it to register one unit charge in a certain period of time, for example one hour. Thus as long as the switch 8 is set to this maximum tariff rate position the counter 21 will continue to register whenever the equipment 13 is being used and will display the total number of unit charges. When the supervisory station personnel desire to operate the system at a lower tariff rate, the arm of the switch 8 can be set to one or the other of the studs connected with the resistors 10 and 9 respectively. Conveniently these lower tariff rates can be one half and one quarter respectively of the highest tariff rate.

There is also shown in FIG. 1 another equipment, 22, the use of which is to be metered. It will be seen that a metering mechanism similar to that hereinbefore described in respect of the parts 14 to 21 is provided in association with this equipment and is connected with the line 12 to enable the metering to be made according to any one of the several tariff rates. In like manner, the individual use of a large number of equipments can be metered through the intermediary of a common supervisory station.

The metering system shown in FIG. 2 differs from that of FIG. 1 in that operation of the system according to different tariff rates is obtained by arranging for the operation of the timing device or of the drive to the metering element to be interrupted for predetermined periods during the time when the equipment, the use of which is being metered, is in use. The supervisory station apparatus of this embodiment is shown above the dot-dash line 23 and comprises a constant speed motor 24 which is adapted to be energised, under the control of a manually operable switch 25, from a suitable A.C. supply connected between the terminals 26. The motor 24 drives, through a suitable gear train 27, cams 28 and 29 which, during their rotation, actuate switches 30 and 31 respectively in such manner that the switch 30 remains open except for about one quarter of each rotation of the cam 28 and the switch 31 remains open except for about one half of each rotation of the cam 29. The switches 30 and 31 are associated with a switch 32, which is ganged for joint manual operation with the switch 25, and the arrangement is such that each of the switches 30 and 31 is included in series between a separate contact stud of the switch 32 and one conductor of a communication line 33 which extends between the supervisory station and the locations of equipments which are to be metered. One stud of the switch 32 is connected directly to this conductor of the line 33. The other conductor of this line is connected to the arm of the switch 32 by way of a battery 34.

There is thus made available at the supervisory station a manually adjustable means whereby the line 33 can be energised by the battery 34 either continuously, for the highest tariff rate, or intermittently with alternative different degrees of interruption for different lower tariff rates. For example, when the switches 25 and 32 are moved from the "off" position, as shown, to bring their respective arms in contact with the adjoining contact stud, the energising circuit of the motor 24 will be closed and the resultant rotation of the cam 28 at a speed of for example one revolution per minute will cause the switch 30 to be closed for one quarter of each minute so that the line 33 will be energised by the battery 34 for a period of one quarter of each minute (lowest tariff rate). Likewise, if the arm of the respective switches 25 and 32 is moved into contact with the next succeeding stud, the cam 29 will cause the switch 31 to close for about one half of each minute in order to energise the line 33 for a period of one half of each minute (intermediate tariff rate). If the arm of the respective switches 25 and 32 is in contact with the next succeeding stud the battery 34 will be connected directly across the line 33 so as to energise the line continuously (highest tariff rate) and for this condition the energising circuit of the motor 24 is broken as at this time it is not necessary to operate the interrupting switches 30 and 31.

An equipment, the use of which is to be metered, is indicated at 35 and a manually operable switch 36 is provided whereby this equipment can be brought into use by connecting it to a local A.C. electric power supply which is made available between the terminals 37. A further switch, 38, which is ganged with the switch 36, serves, when the equipment 35 is in use, to connect the winding of a relay 39 to the line 33 so that contacts 40 of this relay will be closed whenever the line is being energised by the battery 34 of the supervisory station apparatus. Closure of the contacts 40 connects a synchronous motor 41 across the poles of the switch 56 and hence this motor is energised by the local A.C. power supply. The shaft of the motor 41 is connected, by way of a suitable gear train indicated at 42, with the shaft 43 of a revolution counter 44.

The motor 41 and the shaft 43 constitute the timing device and the metering element respectively of this particular metering mechanism and it will be seen that the movement of the shaft 43 will be controlled as a function of the time the equipment 35 is in use. A predetermined degree of movement of the shaft 43 represents a predetermined unit charge, for example a unit of one shilling, and the total movement of said shaft will cause the counter 44 to establish a display which is indicative of the corresponding total number of such units.

When the switch 36 is operated to bring the apparatus 35 into use, the simultaneous operation of the switch 38 serves to connect the relay 39 across the line 33 and, assuming the latter is being energised in accordance with the lowest tariff rate, namely for a period of one quarter of each minute, the contacts 40 will be closed for a period of one quarter of each minute and the motor 41 will be energised for a corresponding period. For this condition the counter 44 will register one unit charge in a predetermined period of time, for example two hours. If the supervisory station personnel desire to operate the system at the intermediate tariff rate then the switches 25 and 32 are set accordingly so that the battery 34 energises the line 33 for a period of one half of each minute and for this condition the counter 44 will register one unit charge in one hour. The system can be operated at the highest tariff rate by setting the switch 32 so that the battery 34 is connected across the line 33 continuously, for which condition the motor 41 of the metering mechanism will be energised continuously and the counter 44 will register one unit charge in a period of thirty minutes.

There is also shown in FIG. 2 a further equipment, 45, the use of which is to be metered and, to a large extent the metering mechanism associated with this equipment is similar to that associated with the equipment 35 in that it includes a manually operable switch 46, whereby the equipment can be energised from an A.C. power supply available across the terminals 47, and a switch 48, which is ganged with the switch 46 and serves to connect the winding of a relay 49 to the line 33 when the equipment is in use. However this arrangement differs from that associated with the equipment 35 by reason of the fact that a synchronous motor 50 (the timing device) is permanently connected to the poles of the switch 46 so that whenever the equipment 45 is in use this motor will be energised, and that contacts 51 of the relay 49 are included in series with an energising winding 52 of a magnetic clutch 53 of any desired suitable kind. The contacts 51 serve, when the relay 49 is energised, to connect the winding 52 between the poles of the switch 46 so that said winding will be energised from the local A.C. power supply and, when so energised, establish a driving connection between the shaft of the motor 50 and a shaft 54 of a gear train 55 by which the metering element, in the form of a shaft 56 of a revolution counter 57, is driven. It will be seen that with this particular metering mechanism the desired interruption of the movement of the metering element is obtained by interrupting, under the control of the energising current available in the line 33, the driving connection between the continuously operating motor 50 and said shaft 56.

It is to be understood that although the metering mechanisms hereinbefore described with reference to FIGS. 1 and 2 are suitable for credit charging, in that the metering mechanism serves only to register the number of unit charges so as to enable the users of equipments to be billed with the charges for the use of the equipments, coin operable or coin freed arrangements can be incorporated in any desired suitable manner to provide facilities for users to make prepayment for the use of an equipment. A prepayment arrangement of this kind is included in the embodiment of the invention now to be described with reference to FIG. 3 of the accompanying drawings. In this embodiment facilities are provided for metering the use of television receivers which form part of subscribers' apparatus in a wired broadcasting system. The signal distributing network of this broadcasting system comprises a pair of independently screened twin-conductor lines 58 and 59 which are arranged in known manner to distribute television signals, pertaining to different programmes, obtained from separate sources 60 and 61 respectively. In this particular case it is being assumed that, whereas for one reason or another reception by a subscriber of the signals from the source 60 is not to be specially charged for, the reception of signals from the source 61 might be charged for according to any one of three different tariff rates and therefore the metering system must be capable of being operated accordingly.

The lines 58 and 59 have separate screens, 62 and 63 respectively, and it is convenient to use these parts of the network to form a communication line between the supervisory station of the metering system and a group of subscribers' apparatus. It is also convenient, though by no means necessary, to arrange for this supervisory station to be located at the central station of the broadcasting system and in the particular arrangement shown in the drawing, the supervisory station apparatus, shown above the dot-dash line 64, comprises cam-operated switching means similar to that hereinbefore described with reference to FIG. 2. Thus it will be seen that a constant speed motor 65 which is energised under the control of a manually operable switch 66 from a suitable A.C. power supply connected across terminals 67, drives cams 68 and 69 by way of a gear train 70. These cams serve simultaneously to actuate timing switches 71 and 72 respectively which, in conjunction with a selector switch 73 ganged with the switch 66, operate to connect a battery 74 across the communication line 62—63. As the operation of such a switching arrangement has hereinbefore been described in detail with reference to FIG. 2, it seems sufficient to mention at this stage that this arrangement makes available at the supervisory station a manually adjustable means whereby the line 62—63 can be energised either continuously (for the highest tariff rate) or cyclically (for one quarter of each one minute period in respect of switch 71 and for one half of each one minute period in respect of switch 72).

A typical subscriber's apparatus of such a wired broadcasting system is shown below the dot-dash line 64 and includes a television receiver 75. A control knob 76 is provided in respect of an "on/off" switch whereby the subscriber can bring this receiver into use by connecting it to a local A.C. power supply which is available from across terminals 77. This receiver is adapted to receive television signals from either of the two lines, 58 and 59, by way of a programme selection switch 78 (and relay contacts 104 and 105 hereinafter described), the drawing showing this switch set to the position for receiving the signals from the source 60.

For the purpose of metering the use of this receiver when it is being used to receive signals emanating from the source 61, the following provisions are made. The programme selection switch 78 has ganged therewith a switch 79 which, when the switch 78 is set to receive the signals from the line 59 (in respect of source 61), connects the winding of a relay 80 to the line 62—63 so that whenever the latter is being energised by the battery 74, under the control of the supervisory station apparatus, this relay 80 will be energised to close switch contacts 81 thereof. These contacts 81 are included in a circuit which also includes a switch 82 that is ganged with the control knob 76 of the receiver so that it operates in unison with the "on/off" switch of said receiver. In addition, this circuit also includes a synchronous motor 83 which constitutes the timing device of the metering mechanism and the arrangement is such that, in so far as credit metering is concerned, this motor will be energised by current available from across the terminal 77 whenever the receiver is switched "on" and the relay 80 is energised. Through the aid of a suitable gear train 84, the motor drives a shaft 85 of a revolution counter 86, said shaft constituting a metering element of the metering mechanism. It will be apparent that the movement of the shaft 85 will be controlled as a function of the time the receiver 75 is in use to receive signals from the source 61 and that, as a predetermined degree of movement of this shaft 85 represents a predetermined unit charge, for example a unit of one shilling, the total movement of the shaft will cause the contour 86 to indicate a corresponding total number of such units in order to enable the subscriber to be billed accordingly. At any time the metering system can be opertaed at any one of the three tariff rates, with corresponding modification of the time required for the counter 86 to register a unit charge as hereinbefore described with reference to FIG. 2.

For the purpose of enabling the subscriber to make prepayment for the metered use of the receiver, this metering mechanism has incorporated therewith a coin-operable arrangement whereby the subscriber can establish, by inserting one or more coins of predetermined denomination, a credit bank which is then consumed by subsequent use of the receiver in respect to the reception of signals from the source 61. This arrangement comprises a pointer 87 mounted to co-operate with a scale 88 calibrated to indicate the number of unit charges, for example shillings, in the credit bank which have not been consumed. This pointer 87 constitutes another metering element and is arranged and adapted to be driven by a shaft 89 which is coupled, by way of a friction clutch 90, with a shaft 91 of the gear train 84. Therefore it will be seen that the pointer is under the control of the motor 83, the nature of this control being hereinafter described.

The shaft 89 is provided with a toothed wheel 92 which is adapted to be engaged by a correspondingly toothed quadrant 93 carried by a shaft 94. Another shaft 95, is arranged coaxial with the shaft 94 and is provided with a handle 96 whereby it can be rotated. Each of the adjacent ends of these shafts 94 and 95 is provided with one section, 97 and 98 respectively, of a coin trap which is adapted to receive a coin, for example a shilling, as it is delivered from a coin shute 99 and use it as a mechanical coupling between the two shafts so that, when the shaft 95 is rotated by hand, this movement will be imparted to the shaft 94 and the quadrant 93 will give a predetermined rotary movement to the wheel 92. This latter movement will cause the pointer 87 to be advanced by an amount corresponding to one unit charge. During the rotation of the shaft 95 the coin will fall from the coin trap to enter a collecting box 100 and in due course the shafts 94 and 95 will return to their normal positions, as shown, with the coin trap ready to receive another such coin. In this way a credit bank of up to eight shillings can be established and the number of unused unit charges will be indicated by the pointer 87 in cooperation with the scale 88.

Whereas in establishing such a credit bank the pointer 87 is advanced by an amount corresponding to the value of the bank, the motor 83 functioning as the timing device of the mechanism is always tending to return the pointer, that is to say to consume the credit bank and this control of the pointer by the timing device means that the return movement of the pointer will be controlled as a function of the time the receiver is in use in respect of signals from the source 61, the speed of such return movement depending upon the particular tariff rate at which the metering system is being operated. For example, at the highest tariff rate a one shilling unit would be consumed in thirty minutes' use of the receiver and, at the lowest tariff rate a one shilling unit would give two hours' use of the receiver.

To ensure that the subscriber normally cannot receive signals from the source 61 when the credit bank is exhausted, the pointer 87 is arranged and adapted to close contacts 101 whenever it occupies the position, shown on the drawing, which corresponds to the credit bank being exhausted. These contacts 101 are included in series with a switch 102 and the winding of a relay 103. The switch 102 is available to the subscriber to enable him to bring the metering mechanism into the prepayment condition. In the drawing this switch 102 is shown in the position for credit payment metering and when it is desired to accept prepayment metering, it is moved to its alternative position. When this switch 102 is in this prepayment position the contacts 101 serve when closed to connect the relay 103 and its associated rectifier across the local A.C. power supply and this energisation of relay 103 will cause contacts 104, 105 and 106 to open. As contacts 104 and 105 are included in the signal input circuit of the receiver, the latter will now be isolated from the programme selection switch 78 and therefore from the signals pertaining to the source 61. The contacts 106 are included in the circuit of the motor 83 and when thus opened put this motor out of operation.

If during such time as the credit bank is exhausted the subscriber wishes, in order to receive the signals from the source 61, to accept credit metering instead of using a coin to reestablish the credit bank, he can re-set the switch 102 to open the circuit of the relay 103 whereupon the contacts 104, 105 and 106 will close to re-connect the input circuit of the receiver and restart the motor 83, the continued use of the receiver in respect of the signals from the source 61 being registered by the counter 86 according to the prevailing tariff rate.

Alternatively, if during such time as the credit bank is exhausted the subscriber uses one or more coins to establish the credit bank in the manner hereinbefore described, the pointer 87 will be moved to allow the contacts 101 to open the circuit of the relay 103 and thereby bring about the desired re-connection of the input circuit of the receiver and re-starting of the motor 83.

Thus, in so far as the signals from the source 61 are concerned, the subscriber can choose either credit metering, prepayment metering or a combination of both. In the latter case, as the counter 86 registers the total number of unit charges in respect of the metered use of the receiver, when a collector calls upon the subscriber to collect the coins from the container 100, the difference between the number of coins in this container and the number registered by the counter represents the number of unit charges which the subscriber has incurred by accepting credit metering and the subscriber can be billed accordingly.

Although only one subscriber's apparatus has been described with respect to the system shown in FIG. 3 it is to be understood that in some cases as many as several hundreds of such apparatus can be provided in conjunction with a single wired broadcasting network and that the metering system enables the individual use of the television receivers thereof in respect of a predetermined programme source to be metered accordingly to any one of the several different tariff rates.

In some embodiments of the invention only two different tariff rates might be catered for whilst in other cases four or more such different tariff rates are possible by providing for a sufficient number of different speeds or periods of interruption of the drive of a metering element.

The several counters, such as 21, 44, 57 and 86 can in some cases be arranged in any suitable manner to provide a record, for example a record on a paper strip, of the number of unit charges registered thereby and, if required this record can include markings which serve to indicate the use of an equipment in respect of a particular programme or a particular period of time.

What I claim is:

1. A metering system comprising, in combination:
   (a) a metering mechanism including
       (1) a metering element movable to indicate a metered value, and
       (2) an electric motor connected to said element for moving the same;
   (b) a source of electric current for said motor;
   (c) control means for conditioning intermittently operating equipment for use;
   (d) first switch means including contacts interposed in circuit between said source and said motor, said first switch means being operatively connected to said control means for closing the contacts thereof when said control means conditions said equipment for use;
   (e) second switch means in circuit with said source, said motor, and the contacts of said first switch means for connecting said source to said motor and for disconnecting said source from said motor while the contacts of said first switch means are closed;
   (f) remotely controlled electrical operating means for operating said second switch means;
   (g) a plurality of timing switches at a location remote from said metering mechanism and said first and second switch means;
   (h) actuating means at said location for simultaneously actuating said timing switches in such a manner that each timing switch is cyclically opened and closed, the ratio between the closed and open period of each timing switch in the respective cycle thereof being different from the corresponding ratio of the remainder of said timing switches;
   (i) a source of electric power for said control means; and
   (j) selector means for selectively connecting one of said timing switches in an energizing circuit with said source of power and said remotely controlled operating means.

2. A system as set forth in claim 1, wherein said control means includes a third switch means for connecting said equipment to said source of electric power, said equipment being electrically operated and conditioned for use by being connected to said source of electric power.

3. A system as set forth in claim 1, wherein said second switch means and said remotely controlled operating means jointly constitute a relay having a winding in circuit with said selector means, and energizable for closing a circuit including said source and said motor while said first switch means is closed.

4. A metering system as set forth in claim 1, wherein said electric motor is a constant speed motor.

5. A metering system as set forth in claim 4, wherein said plurality of timing switches includes a plurality of contacts, a plurality of movable cam means respectively engageable with said contacts for periodically opening and closing the same, and said actuating means include motor means for moving said cam means at a substantially uniform speed.

6. A metering system as set forth in claim 1, further comprising coin controlled apparatus for establishing a credit bank by prepayment; and means connected to said coin controlled apparatus and to said metering element for reducing said credit bank responsive to said movement of said metering element.

7. A metering system as set forth in claim 1, further comprising an intermittently operating piece of equipment, and connector means connecting said piece of equipment to said control means.

References Cited in the file of this patent

UNITED STATES PATENTS

| | | |
|---|---|---|
| 1,315,786 | Morganthaler | Sept. 9, 1919 |
| 1,957,901 | Nehls | May 8, 1934 |
| 2,080,186 | Reymond | May 11, 1937 |
| 2,088,568 | Beecher | Aug. 3, 1937 |
| 2,261,655 | Lowe | Nov. 4, 1941 |
| 2,271,752 | Wickham | Feb. 3, 1942 |
| 2,302,458 | Miner | Nov. 17, 1942 |
| 2,329,400 | Leone | Sept. 14, 1943 |
| 2,527,661 | Stack | Oct. 31, 1950 |
| 2,674,512 | Bogert et al. | Apr. 6, 1954 |
| 2,769,023 | Loew | Oct. 30, 1956 |
| 2,810,521 | Chartrey | Oct. 22, 1957 |
| 2,843,655 | Gottfried | July 15, 1958 |
| 2,944,247 | Breese | July 5, 1960 |
| 2,990,116 | Quinn et al. | June 27, 1961 |
| 3,034,707 | Jefferson | May 15, 1962 |